(12) United States Patent
Serban

(10) Patent No.: US 12,132,862 B2
(45) Date of Patent: *Oct. 29, 2024

(54) DETECTING SCAM CALLERS USING CONVERSATIONAL AGENT AND MACHINE LEARNING SYSTEMS AND METHODS

(71) Applicant: T-Mobile USA, Inc., Bellevue, WA (US)

(72) Inventor: Ovidiu Serban, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,277

(22) Filed: Oct. 6, 2023

(65) Prior Publication Data

US 2024/0040038 A1 Feb. 1, 2024

Related U.S. Application Data

(63) Continuation of application No. 17/897,792, filed on Aug. 29, 2022, now Pat. No. 11,818,289, which is a
(Continued)

(51) Int. Cl.
*H04M 3/00* (2024.01)
*G06N 20/00* (2019.01)
(Continued)

(52) U.S. Cl.
CPC ............ *H04M 3/493* (2013.01); *G06N 20/00* (2019.01); *H04M 3/436* (2013.01); *H04M 2203/6027* (2013.01)

(58) Field of Classification Search
CPC ................ H04M 3/493; H04M 3/436; H04M 2203/6027; G06N 20/00
(Continued)

(56) References Cited

U.S. PATENT DOCUMENTS

| 2,763,386 A | 9/1956 | Hilding |
| 5,557,667 A | 9/1996 | Bruno et al. |

(Continued)

FOREIGN PATENT DOCUMENTS

| EP | 1211875 B1 | 9/2004 |
| EP | 1507394 A2 | 2/2005 |

(Continued)

*Primary Examiner* — William J Deane, Jr.
(74) *Attorney, Agent, or Firm* — Perkins Coie LLP

(57) ABSTRACT

Systems and methods for detecting indications of a scam caller are disclosed. Call data, such as call audio, is received and used to create a training dataset. Using the training dataset, a machine learning model is trained to detect indications of a scam caller in a phone call. An Interactive Voice Response (IVR) model is trained or configured, using voice samples of speech of a subscriber of a telecommunications service provider, to simulate speech and conversation of the subscriber. A conversational agent is generated using the IVR model and the trained machine learning model. The conversational agent receives a phone call, engages a caller in simulated conversation, and detects indications of whether the caller is a likely scam caller. If the caller is determined to be a likely scam caller, an alert can be generated and/or the call can be disconnected.

20 Claims, 6 Drawing Sheets

Related U.S. Application Data continuation of application No. 17/372,337, filed on Jul. 9, 2021, now Pat. No. 11,463,582.

(51) Int. Cl.
*H04M 3/436* (2006.01)
*H04M 3/493* (2006.01)

(58) Field of Classification Search
USPC ............ 379/218.01, 201.01, 265.01–265.14, 379/266.01–266.1, 309
See application file for complete search history.

(56) References Cited

U.S. PATENT DOCUMENTS

| | | |
|---|---|---|
| 5,563,937 A | 10/1996 | Bruno et al. |
| 6,389,117 B1 | 5/2002 | Gross et al. |
| 6,480,599 B1 | 11/2002 | Ainslie et al. |
| 6,831,966 B1 | 12/2004 | Tegan et al. |
| 6,870,909 B2 | 3/2005 | Gross et al. |
| 6,879,677 B2 | 4/2005 | Trandal et al. |
| 6,891,940 B1 | 5/2005 | Bhandari et al. |
| 6,898,275 B2 | 5/2005 | Dolan et al. |
| 6,931,116 B1 | 8/2005 | Gross et al. |
| 7,831,029 B2 | 11/2010 | Gross et al. |
| 8,175,245 B2 | 5/2012 | Gross et al. |
| 8,345,833 B1 | 1/2013 | Trandal et al. |
| 9,350,858 B1 | 5/2016 | Roths |
| 9,692,885 B2 | 6/2017 | Bhupati |
| 10,102,868 B2 | 10/2018 | Baracaldo Angel et al. |
| 10,110,741 B1 | 10/2018 | Cohen et al. |
| 10,455,085 B1 | 10/2019 | Roundy et al. |
| 10,535,019 B2 | 1/2020 | Baracaldo Angel et al. |
| 10,657,971 B1 | 5/2020 | Newstadt et al. |
| 10,659,605 B1 | 5/2020 | Braundmeier et al. |
| 10,778,859 B2 | 9/2020 | Hachisuga et al. |
| 11,102,344 B1 | 8/2021 | Buentello et al. |
| 11,196,859 B1 | 12/2021 | Yin |
| 2004/0170257 A1 | 9/2004 | Gross et al. |
| 2004/0196966 A1 | 10/2004 | Bushnell |
| 2005/0117726 A1 | 6/2005 | Dement et al. |
| 2005/0233733 A1 | 10/2005 | Roundtree et al. |
| 2006/0126820 A1 | 6/2006 | Trandal et al. |
| 2006/0211405 A1 | 9/2006 | Scalisi et al. |
| 2014/0297272 A1* | 10/2014 | Saleh ................. G10L 25/48 704/208 |
| 2016/0360036 A1 | 12/2016 | Ansari |
| 2017/0053318 A1* | 2/2017 | Cullen ............... G06Q 30/0269 |
| 2017/0134574 A1 | 5/2017 | Winkler |
| 2019/0166069 A1 | 5/2019 | Yao et al. |
| 2019/0174000 A1 | 6/2019 | Bharrat et al. |
| 2019/0325345 A1 | 10/2019 | Baracaldo Angel et al. |
| 2020/0034743 A1 | 1/2020 | Baracaldo Angel et al. |
| 2021/0136200 A1 | 5/2021 | Li et al. |
| 2022/0148568 A1 | 5/2022 | Kulkarni et al. |
| 2022/0345570 A1 | 10/2022 | Garg et al. |

FOREIGN PATENT DOCUMENTS

| | | |
|---|---|---|
| EP | 1687960 A2 | 8/2006 |
| WO | 03039121 A1 | 5/2003 |
| WO | 2014074936 A2 | 5/2014 |

* cited by examiner

DETECTING SCAM CALLERS USING CONVERSATIONAL AGENT AND MACHINE LEARNING SYSTEMS AND METHODS

CROSS-REFERENCE TO RELATED APPLICATION

This application is a continuation of U.S. patent application Ser. No. 17/897,792, filed Aug. 29, 2022, entitled DETECTING SCAM CALLERS USING CONVERSATIONAL AGENT AND MACHINE LEARNING SYSTEMS AND METHODS, which is a continuation of U.S. patent application Ser. No. 17/372,337 (now U.S. Pat. No. 11,463,582), filed Jul. 9, 2021, entitled DETECTING SCAM CALLERS USING CONVERSATIONAL AGENT AND MACHINE LEARNING SYSTEMS AND METHODS, which are hereby incorporated by reference in their entireties.

BACKGROUND

Nuisance phone calls comprise unwanted and/or unsolicited phone calls. Common types of nuisance phone calls include scam calls, prank calls, telemarketing calls, and silent calls. Nuisance phone calls can be used in furtherance of scams, to commit fraud, or to otherwise harm or inconvenience call recipients.

Caller ID provides limited protection against nuisance calls, but nuisance callers can attempt to avoid Caller ID detection, such as by disabling Caller ID or spoofing. Thus, a recipient of a phone call often must answer the phone call to determine whether it is a nuisance phone call.

BRIEF DESCRIPTION OF THE DRAWINGS

Detailed descriptions of implementations of the present invention will be described and explained through the use of the accompanying drawings.

Figure 1:
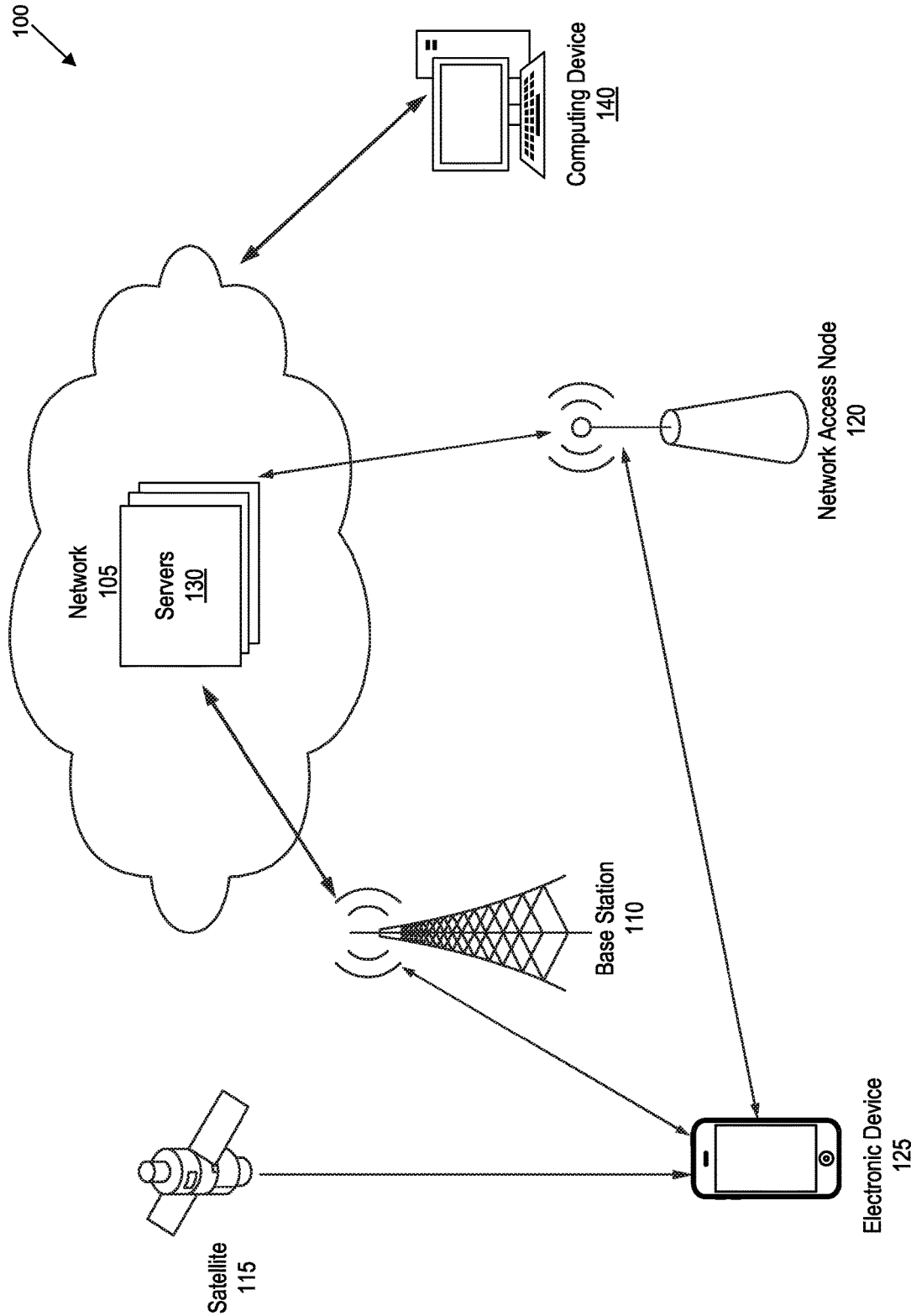
FIG. 1 is a block diagram illustrating a suitable computing environment within which a system for detecting scam callers using a conversational agent operates.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Scam callers are a source of dissatisfaction for subscribers of telecommunication service providers. The Federal Communications Commission (FCC) reports that unwanted calls are the source of the most complaints received by the FCC, comprising more than 200,000 complaints each year and roughly 60 percent of all received complaints. It is estimated that consumers in the United States alone received nearly 4 billion robocalls per month in 2018. Unfortunately, proliferation of inexpensive technologies make it easier for scammers to make many robocalls (e.g., thousands or millions) and to "spoof" Caller ID information to hide a caller's true identity. Thus, existing technologies, such as technologies that rely on caller blacklisting or whitelisting to detect scam callers, can be ineffective against scam callers with access to cheaper and more advanced calling technologies.

Furthermore, existing technologies typically can only detect indications of a scam caller before call setup, such as by evaluating a caller phone number against a caller blacklist or whitelist. Thus, if a scam caller avoids detection before call setup then a subscriber often is unaware that a caller is a scam caller until the subscriber answers the call and attempts to interact with the scam caller, which may be, for example, a robocaller, a prerecorded message, or an Interactive Voice Response (IVR) system, or other simulation of human speech. Scam callers use these and other technologies to target subscribers of telecommunications service providers on a large scale and to avoid detection. Thus, recipients of scam calls face a difficult technical challenge in attempting to detect scam callers and combat the technological tools available to scammers and other nuisance callers.

Accordingly, there is a need for a solution that overcomes the foregoing technical problems and provides other benefits. For example, there is a need for a technical solution that can detect a scam caller without requiring a subscriber to answer a call and interact with the scam caller.

Disclosed herein are systems and related methods for detecting scam callers using a conversational agent that includes an IVR model trained or configured to simulate speech of a subscriber of a telecommunications service provider and a machine learning model trained to detect indications of a scam caller in a phone call ("system" or "scam caller detection system"). For example, using the disclosed system, a phone call can be received at a mobile device from a suspected scam caller and answered by the conversational agent instead of the subscriber of the telecommunications service provider. Using the IVR model, the system simulates speech of the telecommunications service provider and engages the caller in a simulated conversation. During the simulated conversation, the system uses the trained machine learning model to detect indications whether the caller is a scam caller. If the caller is identified as a likely scam caller, the call can be disconnected and/or an alert can be generated to the subscriber of the telecommunications service provider. If the caller is not identified as a likely scam caller, the call can be allowed for the subscriber to either answer or decline, like a normal phone call.

As described herein, the scam caller detection system includes a conversational agent comprising both an IVR model trained or configured to simulate speech of a telecommunications service provider and a trained machine learning model to detect indications of a scam caller in a phone call (e.g., a live phone call, recorded phone call, voicemail, etc.).

The IVR model can be trained using machine learning to simulate human speech and engage in conversations. For example, the IVR model can be trained using a training dataset of phone call audio to simulate a called party in a telephone call. In some implementations, the training dataset is specific to a subscriber of a telecommunications service provider. In other words, the IVR model can receive audio from a set of phone calls in which the subscriber is speaking and can be trained using the received audio to simulate the subscriber in phone calls. Additionally or alternatively, the IVR model can be trained using a training dataset that is not specific to the telecommunications service provider, such as a dataset of phone call audio data including a variety of called and calling parties. In these and other implementations, the IVR model can then be configured to simulate speech of a subscriber of a telecommunications service provider using a small number (e.g., 5 to 20) of audio samples of the subscriber speaking, and/or a short (e.g., 1 to 5 minutes) recording of the subscriber speaking from a predetermined script. For example, the audio samples or the recording of the predetermined script can include a variety of phrases and words such that the system can extract representative characteristics of the subscriber's speech (e.g., pitch characteristics, rate of speaking, pronunciation characteristics, and so forth).

The machine learning model to detect scam callers can be trained using a dataset of phone call audio that includes known scam callers and known good callers. For example, the machine learning model can be trained to analyze call audio to detect patterns indicating that a calling party is a scam caller. These patterns can reflect, for example, that a scam caller is unable to respond to conversational prompts or questions, e.g., because the caller is a robocaller or prerecorded message. These patterns can also indicate, for example, that the caller uses keywords or phrases indicative of a scam caller. In addition to detecting indications of a scam caller in call audio, the machine learning model can be trained to detect and associate other indications of a scam caller, such as based on a phone number or other identifier associated with the caller (e.g., because the phone number is present on a whitelist or blacklist of known callers). Additionally, the machine learning model can be trained or configured in other ways to detect indications of a caller type. For example, the machine learning model can receive or access information about callers or entities that are known to a subscriber and, upon detecting speech related to this information in a phone call, the machine learning model can determine that the caller is unlikely to be a scam caller. The information about callers or entities can be, for example, information about contacts of the subscriber (e.g., stored in a directory, on a mobile device, etc.), employment information, businesses associated with the subscriber, personal information, and so forth. For example, the machine learning model can be trained or configured such that the model has information that the subscriber is a client of a particular bank. When the system receives a phone call from the bank, the machine learning model can detect in the phone call that the caller mentions the name of the bank or other information related to the bank. Based on this, the model determines that the caller is unlikely to be a scam caller because the caller mentions an entity (the bank) that the model knows to be associated with the subscriber.

For purposes of illustration, the present disclosure describes using the disclosed system to detect scam callers. However, those skilled in the art will understand that the present technology can be applied in any situation wherein it is necessary or desirable to classify calls or callers based on call data, such as audio content. For example, in addition to detecting scam callers, the present technology can be used to classify other kinds of callers, such as identifying telemarketers, customers of a business, friends of a subscriber, work-related calls, and so forth. Additionally, although examples provided herein are in the context of phone calls (e.g., received on a smartphone or other mobile device), the present technology can be applied in the context of other communication technologies, such as video calls, text messages, emails, and so forth.

In the following description, for the purposes of explanation, numerous specific details are set forth in order to provide a thorough understanding of implementations of the present technology. The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Suitable Environments

FIG. 1 is a block diagram illustrating a suitable environment 100 within which a system for detecting scam callers using a conversational agent operates. The environment 100 includes one or more networks 105, including telecommunications networks, accessed by subscribers via electronic devices 125. Electronic devices 125 can include, without limitation, mobile devices or other user equipment (UE) associated with subscribers, such as smartphones or other mobile phones, tablet computers, laptop computers, desktop computers, wearable devices, and so on. The networks 105 can include wired or wireless, public or private, networks including, for example, the internet. At least a portion of the networks 105 comprise one or more telecommunications networks provided by a telecommunications service provider having subscribers associated with electronic devices 125. To provide features of the network, telecommunications service providers use one or more servers 130, which can be used to provide all or portions of the disclosed scam caller detection system.

Subscribers use electronic devices 125 to access the networks 105 via base stations 110, network access nodes 120, and/or satellites 115. A base station is a type of network access node (NAN) that can also be referred to as a cell site, a base transceiver station, or a radio base station. The environment 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

Electronic devices 125 are used to send and receive calls, texts or other messages (e.g., Short Message Service (SMS) or Rich Communication Services (RCS) messages), and other data via networks 105.

The environment 100 further includes one or more computing devices 140, which are used by scam callers to generate scam calls or other unwanted calls (e.g., robocalls or other nuisance calls) to electronic devices 125. Computing devices 140 can be any device capable of making a phone call or other communication (e.g., voice call, video call, etc.), such as a mobile device, a landline telephone, a laptop or desktop computer, a tablet, and so forth. Computing devices 140 can use various technologies to generate phone calls or other communications via networks 105 and to avoid detection, such as automatic dialers, robocallers, Caller ID spoofing technology, Voice Over IP (VoIP) calling, IVR systems, recorded messages, and so forth.

In an example use case, a scam caller uses a computing device 140 to place a phone call to an electronic device 125 via network 105. The call is received by the scam caller detection system, for example, via an application installed on the electronic device 125. In some implementations, all calls received by the electronic device 125 are directed to the scam caller detection system. In some implementations, certain allowed callers can bypass the scam caller detection system (e.g., callers identified in a contact list). In some implementations calls are only received by the scam caller detection system if the call is from a suspected scam caller (e.g., based on a phone number or other identifier appearing on a blacklist or a database of known or suspected scam callers, or other call data or metadata). A call can be routed to the scam caller detection system, for example, using existing technologies for identifying scam callers, such as T-Mobile ScamShield™. Upon being received by the scam caller detection system, the call is answered using the IVR model of the system. The IVR model simulates speech of the subscriber associated with the electronic device 125 and engages the caller in a simulated conversation. While the call is occurring (e.g., in a matter of seconds or minutes), the trained machine learning model of the system analyzes the call audio to detect indications that the caller is a scam caller. If the machine learning model determines that the caller is a likely scam caller then the call can be automatically disconnected and/or an alert can be displayed at the electronic device 125 to notify the subscriber that the caller is a likely scam caller. If the machine learning model determines that the caller is not a likely scam caller then the system allows the call and the subscriber can then choose whether to accept the call at the electronic device 125. Furthermore, a record of the call can be generated, including call data and metadata and information about whether the call was determined to be associated with a likely scam caller.

FIG. 1 and the discussion herein provide a brief, general description of a suitable environment 100 in which the scam caller detection system can be supported and implemented. Although not required, aspects of the system are described in the general context of computer-executable instructions, such as routines executed by a computer, e.g., a mobile device, a server computer, or a personal computer. The system can be practiced with other communications, data processing, or computer system configurations, including: internet appliances, handheld devices (including tablet computers and/or personal digital assistants (PDAs)), Internet of Things (IoT) devices, all manner of cellular or mobile phones, multi-processor systems, microprocessor-based or programmable, consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet-switched, circuit-switched, or other scheme). Portions of the system can reside on a server computer, while corresponding portions can reside on a client computer such as a mobile or portable device, and, thus, while certain hardware platforms are described herein, aspects of the system are equally applicable to nodes on a network. In alternative implementations, the mobile device or portable device can represent the server portion, while the server can represent the client portion.

In some implementations, one or more of the electronic devices 125 and/or cell sites associated with a telecommunications network accessed by the user devices 125 can include network communication components that enable the devices to communicate with remote servers or other portable electronic devices by transmitting and receiving wireless signals using a licensed, semi-licensed, or unlicensed spectrum over a communications network, such as networks 105. In some cases, the networks 105 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the electronic device is configured to operate and switch among multiple frequency bands for receiving and/or transmitting data.

Scam Caller Detection System

Figure 2:
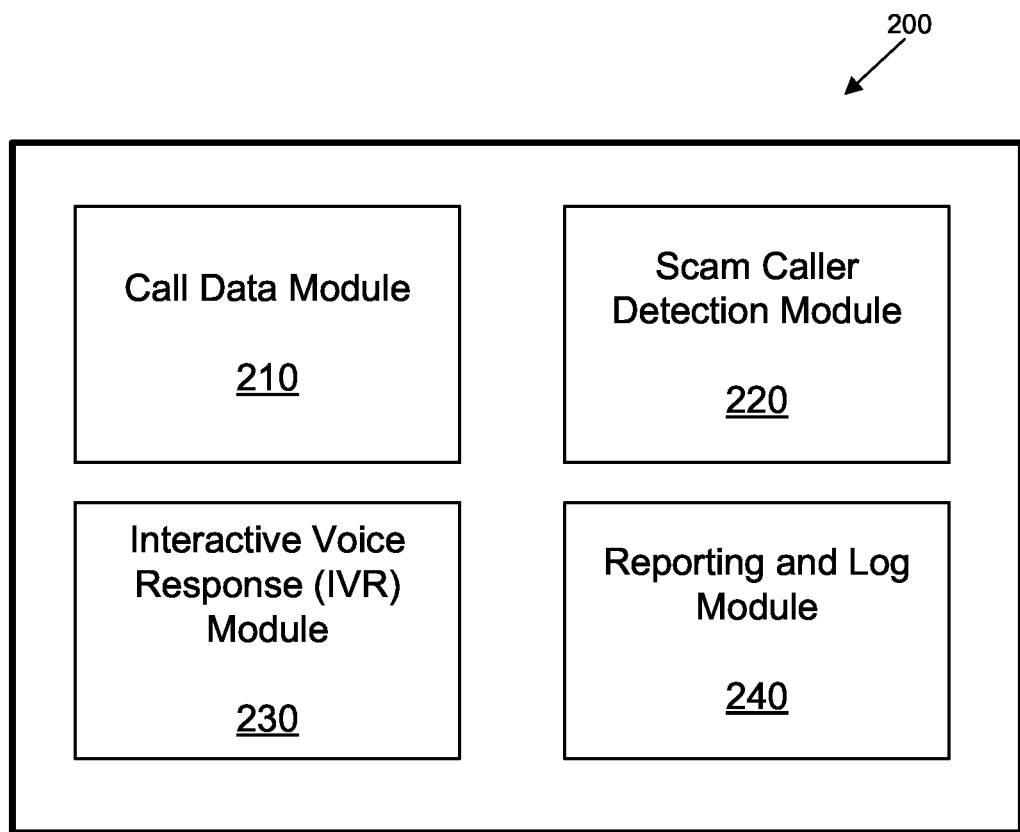
FIG. 2 is a block diagram illustrating components of a system for detecting scam callers using a conversational agent.

FIG. 2 is a block diagram illustrating components of a scam caller detection system 200 using a conversational agent to detect scam callers. The system 200 can be provided, for example, by a telecommunications service provider that provides all or a portion of networks 105 using servers 130. Additionally or alternatively, portions of the system 200 may reside on or be provided via electronic devices 125 associated with subscribers of the telecommunications service provider, such as via one or more software applications installed on electronic devices 125.

The scam caller detection system 200 can include functional modules that are implemented with a combination of software (e.g., executable instructions or computer code) and hardware (e.g., one or more memories and one or more processors). Accordingly, as used herein, in some examples a module is a processor-implemented module or set of code, and represents a computing device having a processor that is at least temporarily configured and/or programmed by executable instructions stored in memory to perform one or more of the functions described herein. For example, the scam caller detection system can include a call data module 210, a scam caller detection module 220, an Interactive Voice Response (IVR) module 230, and a reporting and log module 240, each discussed separately below.

Call Data Module

The call data module 210 is configured and/or programmed to receive/store/process data associated with phone calls or other communications. Call data can include a variety of data or metadata associated with phone calls, such as call detail records (CDRs), call logs, and/or audio of phone calls (e.g., recorded or transcribed audio).

A first category of call data received/stored/processed by the call data module is scam caller data comprising data (e.g., call audio) and/or metadata associated with calls in which a known scam caller is present. Scam caller data can be used to create training datasets to train, by the scam caller detection module 220, a machine learning model to detect indications in a phone call that a caller is a scam caller, as described herein below. For example, call data can include call audio from a large number of calls (e.g., 1000 calls, 2000 calls, 3000 calls, etc.) wherein a known scam caller is present. In some implementations, the call audio can be processed to isolate portions of the audio, such as separating audio for respective speakers on a call, isolating particular words or phrases, isolating sentences or portions of sentences, breaking the call into predetermined segments (e.g., analyzing a call in 30-second or one-minute increments). The call data can also optionally include associated call detail records (CDRs) or other data or metadata characterizing the calls in the call audio. To create training datasets, the call data can be analyzed or processed in various ways, such as by calculating count or frequency (e.g., per call or per minute) of certain key words or phrases indicative of a scam caller. These key words or phrases can be associated with topics typical of a scam caller, such as fraudulent claims of a financial or legal emergency (e.g., "problem with your account," "problem with your card," "warrant for your arrest," and so forth). In addition, to create training datasets, call data can also be analyzed or processed based on occurrence of unusual speech patterns indicative of a scam caller, such as unusual pauses (e.g., exceeding 5, 10, 15, 20 seconds, etc.), unusual crosstalk (e.g., indicating that a caller keeps talking when the called party is talking), responses from the called party indicating that the caller is a scam caller (e.g., if a called party repeats the word "hello?" multiple times, asks "is anyone there?" etc.). The foregoing call attributes can be used to generate or express variables characterizing call audio, such as count, frequency, and so forth. For example, variables can be associated with count or frequency of key words or phrases, count or frequency of unusual pauses, count or frequency of crosstalk, unusual call duration (e.g., a call lasting less than 1, 2, 3, 4, or 5 seconds, etc.).

A second category of call data received/stored/processed by the call data module is typical call data comprising data (e.g., call audio) associated with normal phone calls in which a subscriber of a telecommunications service provider interacts with a calling party. The typical call data can be specific to a certain subscriber of a telecommunications service provider, and/or it can be for a variety of callers and called parties. The typical call data can be used to create training datasets to train, by the Interactive Voice Response (IVR) module 230, an IVR model to simulate speech of a subscriber of a telecommunications service provider. In implementations wherein the typical call data is not specific to a certain subscriber of a telecommunications service provider, the IVR model can be further configured and/or trained using audio samples of a subscriber's voice, such that the trained IVR model can be modified to simulate the subscriber's voice.

For example, typical call data can include call audio for a large number or duration of phone calls (e.g., 1000 calls, 2000 calls, 3000 calls, 500 hours of call audio, 1000 hours of call audio, 5000 hours of call audio, etc.). To facilitate training of the IVR model, the typical call audio can be processed in various ways, such as by isolating audio of specific speakers, isolating sentences or phrases, dividing call audio into predetermined segments (e.g., a minute, five minutes, etc.), and so forth. The typical call audio can then be analyzed for various speaker attributes, such as pitch, rate of speaking, word choice, etc. In some implementations, training an IVR model can include labeling specific types or categories of words, phrases, or sentences, such as typical greetings (e.g., "hello," "how are you doing?" etc.), basic questions (e.g., "who is calling?" "what is this call about?" "what can I do for you?"), responses to questions (e.g., stating the name of a subscriber), and so forth. These labels can then be used by a trained IVR model to generate various responses in different phone calls, e.g., by randomly choosing a greeting from a set of predetermined greetings that can be generated by the IVR model. The typical call audio can then be used to train the IVR model to simulate a specific speaker (e.g., a subscriber) or a generic speaker in a phone call.

In addition to call data, the call data module 210 can also store/receive/process other kinds of data, such as data about known callers or entities that can be used to detect that a caller is unlikely to be a scam caller. This data can include a contact list or other list of callers known to a subscriber (e.g., names, phone numbers, and other identifying information), identifying information for entities known to or associated with the subscriber (e.g., employer information, businesses associated with the subscriber, etc.), and so forth. For example, the call data module 210 can further store or generate a profile of a subscriber that can be used to determine whether a caller is unlikely to be a scam caller because the caller mentions information stored in the profile (e.g., an employer name, a business name, a contact name, the subscriber's name, or topics relevant to the foregoing).

Scam Caller Detection Module

The scam caller detection module 220 is configured and/or programmed to use call data from the call data module 210 to train a machine learning model to detect indications in a phone call that a caller is a likely scam caller.

The scam caller detection module 220 receives, from the call data module 210, one or more training datasets comprising call data associated with known scam callers and call data associated with known good callers. As described above, the training datasets can comprise call audio and/or other call data analyzed and/or processed to identify attributes of different caller types, such as variables or attributes characterizing call audio (e.g., frequencies or counts associated with key words or phrases, unusual pauses, unusual crosstalk, etc.).

The scam caller detection module 220 then uses the one or more training datasets to train a machine learning model to detect, in a live phone call, whether a caller is a likely scam caller. For example, a machine learning model can be trained to detect key words or phrases, unusual pauses, unusual crosstalk, and so forth indicative of a likely scam caller (e.g., by calculating, during a call, one or more variables, identifying call attributes, etc.). As described above, the scam caller detection module 220 can also be trained to detect, in a live phone call, that caller speech in the phone call is associated with information stored in a subscriber profile, in which case the scam caller detection module 220 may determine that the caller is unlikely to be a scam caller. In some implementations, call attributes can be analyzed to identify one or more topics or subjects discussed during the call (e.g., financial, legal, employment, personal, commercial, etc.), which can be used to help detect whether a caller is a likely scam caller. Any combination of the foregoing can then be used to generate a confidence score, such as a numerical score indicating a likelihood that a caller is a scam caller. In some implementations, a confidence score can be generate or adjusted based on one or more confirming events detected or categorized in a call, such as a level of urgency (e.g., if a caller requests an immediate response), a topic (e.g., criminal investigation, financial emergency), indications of avoidance (e.g., if a caller does not respond to questions or prompts), which can increase or decrease a confidence score.

In some implementations, a confidence score can be adjusted during the course of a received phone call, for example, as a caller provides more speech, or based on questions or prompts generated by the scam caller detection module 220. For example, the scam caller detection module 220 can generate an initial confidence score based on initial call audio in a received phone call indicating an initial likelihood that a caller is only somewhat likely to be a scam caller. The scam caller detection module 220 can then generate a question or prompt configured to elicit a response from the caller that will either increase or decrease a confidence score. For example, the system may generate a question such as "what is this call about?" or "what can I do for you?" Depending on the response from the caller and whether the response is indicative of a scam caller, the confidence score can be adjusted up or down. When the confidence score exceeds a predetermined threshold (e.g., 70%, 80%, 90%, etc.), then the caller is determined to be a scam caller.

Interactive Voice Response (IVR) Module

The Interactive Voice Response (IVR) module 230 is configured and/or programmed to use typical call data from the call data module 210 to train and/or configure an IVR model to simulate speech of a subscriber of a telecommunications service provider. The IVR module 230 can receive, from the call data module 210, one or more training datasets comprising call data (e.g., call audio) associated with typical calls. In some implementations, these calls are associated with a specific subscriber of a telecommunications service provider such that the IVR model is trained to simulate that subscriber's speech in a phone call. In some implementations, these calls are not associated with a specific subscriber, and are instead associated with various callers and called parties. As described above, in such implementations, the IVR model is trained to simulate speech of a called party in a phone call, and the trained IVR model is then modified based on audio samples of speech of a particular subscriber of a telecommunications service provider.

Reporting and Log Module

The reporting and log module 240 is configured and/or programmed to record information associated with received phone calls, such as whether the call is determined to be associated with a scam caller or a legitimate caller. As further described below, scam caller detection system 200 includes a conversational agent comprising the trained IVR model and the trained machine learning model. The conversational agent can be applied to receive phone calls (e.g., live phone calls) and analyze, during the calls, whether the caller is a likely scam caller. The reporting and log module 240 records and reports information about these received phone calls. For example, if a caller is determined to be a likely scam caller, the reporting and log module 240 can cause display on a subscriber's mobile device of a report showing that a call was determined to be associated with a likely scam caller, a phone number associated with the call, a time and date for the call, and so forth. The reporting and log module 240 can further log this call information in a database, for example, so that the information can be used to add a caller to a blacklist of callers. In some implementations, rather than automatically classifying a caller as a scam caller, the system can request confirmation from a subscriber that a caller is a scam caller, e.g., by having the caller review a call transcript or recording and select an icon or button confirming that the caller is a scam caller. In such implementations, this subscriber confirmation can also be logged by the reporting and log module 240.

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, models trained by the scam caller detection module 220 and/or the IVR module 230 can include a neural network with multiple input nodes that receive training datasets. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to assess likelihood that a caller is a scam caller, and so forth. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new call data.

Training of IVR Model

Figure 3:
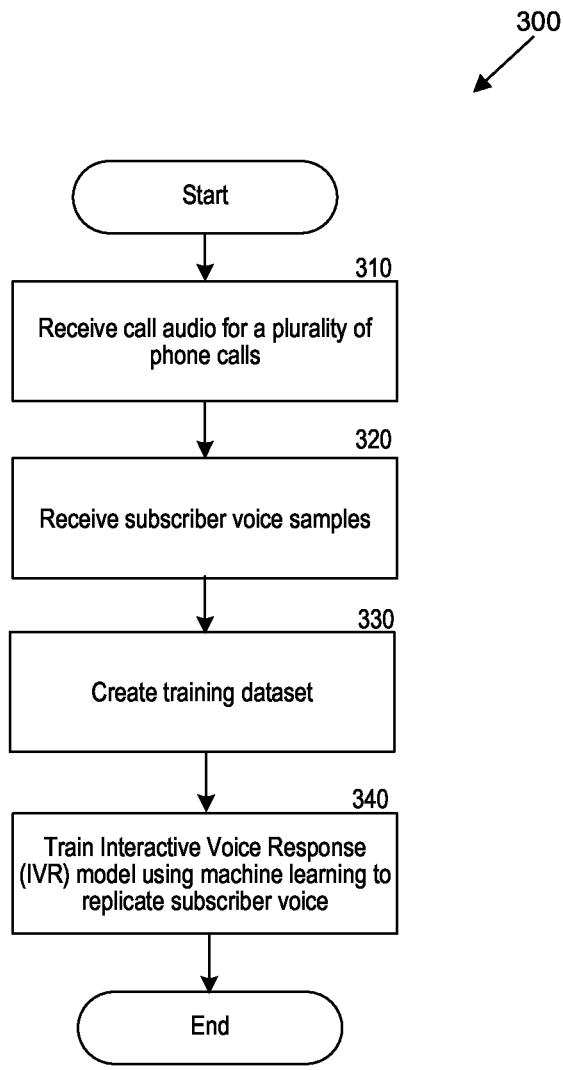
FIG. 3 is a flow diagram illustrating an example process for training or configuring an IVR model to simulate a subscriber voice.

FIG. 3 is a flow diagram illustrating a process 300 for training an IVR model to simulate speech and conversation of a subscriber of a telecommunications service provider. The process begins at block 310, where call audio is received for a plurality of phone calls. These phone calls can be associated with a variety of callers and called parties. The received call audio represents typical phone calls in which a caller and a called party engage in conversation.

The process 300 then proceeds to block 320, where voice samples are received comprising live or recorded audio of a subscriber speaking. In some implementations, the voice samples are of a predetermined script that allows the present technology to recognize and simulate speech by the subscriber. In some implementations, the voice samples are of common words or phrases that can be used in a subsequent phone call answered by the conversational agent, as described below. These voice samples can include the subscriber saying: "Who is this?" "Hello?" "I can't hear you" "How can I help you?" and so forth.

In some implementations, the voice samples include audio of a subscriber reading a predetermined script, such as a script including a variety of spoken words, phrases, sounds, formants, etc. Collectively, the speech from the predetermined script provides a representative sample of the subscriber's speech (e.g., vowel sounds, consonant sounds, common words or phrases, etc.). The voice samples can be, for example, for a certain duration or range of durations (e.g., a minute, five minutes, ten minutes, etc.).

The process 300 then proceeds to block 330, where a training dataset is created using the call audio for the plurality of phone calls and the voice samples comprising the live or recorded audio of the subscriber speaking. The training dataset can include large amounts of call audio (e.g., hundreds or thousands of hours) analyzed or processed in various ways, such as by separating audio of callers from called parties, analyzing call audio by isolating sentences, phrases, words, or segments, and/or characterizing portions of the call audio. The call audio can be analyzed to identify categories of words or phrases, such as greetings, questions, responses to questions, and so forth.

The process then proceeds to block 340, where an IVR model is trained (e.g., by the IVR module 230) to simulate speech of the subscriber in a live phone call. Based on the training, the IVR model is then able to simulate speech of the subscriber and engage in simulated conversations with callers in live phone calls.

Training of Machine Learning Model

Figure 4:
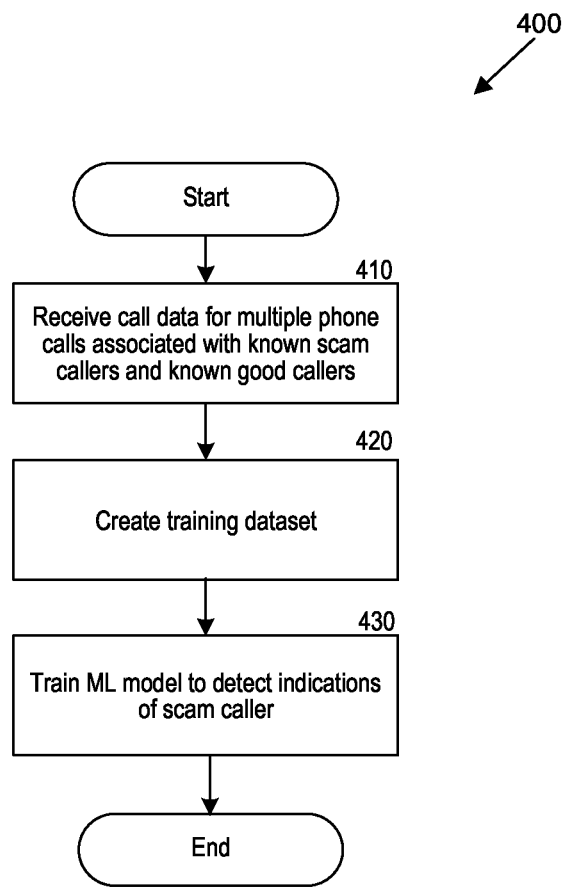
FIG. 4 is a flow diagram illustrating an example process for training a machine learning model to detect indications of a scam caller.

FIG. 4 is a flow diagram illustrating a process 400 for training a machine learning model to detect indications of a scam caller during a phone call. The process 400 begins at block 410, where call data is received for multiple phone calls associated with known scam callers and known good callers. This call data can be, for example, call audio, such as recorded phone calls. Call data can include metadata and other information as well, such as call detail records (CDRs), identities of a caller and/or called party, identifiers associated with callers and/or called parties (e.g., phone numbers), device information for callers and/or called parties, phone number information (e.g., type of number, location information, etc.), telecommunication service provider information, and so forth. Call data can also include network-level data, such as data about a telecommunications service provider associated with the caller and/or about a telecommunications network or components thereof.

The process 400 then proceeds to block 420, where a training dataset is created using the received call data. Creating the training dataset can include, for example, processing the received call data. In implementations where the training dataset is limited to call audio, the call audio can be extracted from the call data. Creating the training dataset can include calculating variables and/or identifying characteristics of the call data. In addition, creating the training dataset can include identifying metadata or other information about each call or caller, such as whether the caller number is domestic or international, whether the number is part of a range of a verifiable carrier, and so forth. It can also include identifying information about the duration of the call, whether the call had abruptly ended, or the number of call instances the caller had initiated in a certain time period. For example, a very frequent number of calls over a short period from an unverified caller can be associated with a high confidence of a scam caller. These and other characteristics of call data can be identified (e.g., by tagging data, calculating variables, etc.) in a training dataset.

The process 400 then proceeds to block 430, where the training dataset is used to train the machine learning model to detect indications of a scam caller in a phone call.

Once the machine learning model is trained, according to process 400, and the IVR model is trained, according to process 300, the IVR model and the machine learning model can be incorporated in a conversational agent of the system that can receive phone calls, simulate conversations, and detect indications of a scam caller, as described herein. The processes 300 and 400 can be performed in any order, including being performed in parallel with one another. Additionally, operations can be added to or removed from the processes 300 and 400 without deviating from the teachings of this disclosure. In some implementations, the process 300 can be optional, and the conversational agent can instead include IVR models or other technologies for simulating a speaker wherein the models are not specific to simulating speech of the subscriber. In some implementations, a phone call can instead be answered by a person, such as a subscriber of a telecommunications service provider, who then attempts to engage a caller in conversation, and the machine learning model can evaluate the phone call based on the conversation between the person and the caller.

In some implementations, processes 300 and 400 can include testing the conversational agent, or portions of the conversational agent (e.g., the IVR model or the machine learning model). For example, a portion of the call data (e.g., 10%) received at block 410 can be excluded from the training dataset and used as test data to assess the accuracy of the trained machine learning model. The trained machine learning model is applied to the test data to determine whether the model correctly assesses the likelihood that callers represented in the test data are scam callers with an accuracy beyond a threshold level (e.g., 70% accurate, 80% accurate, 90% accurate, etc.). If the trained machine learning model does not exceed the threshold accuracy when applied to the test data then the model can be retrained or discarded in favor of a more accurate model. Similarly, the trained IVR model can be tested (e.g., by a subscriber) to determine whether the trained IVR model can simulate speech and conversation by the subscriber to a level that is acceptable. For example, the subscriber can attempt to engage in a conversation with the trained IVR model and determine whether the trained IVR model responds to prompts or questions similar to the way a human speaker (e.g., the subscriber) would, whether the trained IVR model sounds like the human speaker, and so forth.

Retraining the machine learning model can include training the model at least a second time using the same training dataset, training the model with a different (e.g., expanded) training dataset, applying different weights to a training dataset, rebalancing a training dataset, and so forth. Similarly, retraining the IVR model can include training the model at least a second time using the same training dataset, training the model with a different (e.g., expanded) training dataset, applying different weights to a training dataset, rebalancing a training dataset, and so forth. Retraining the IVR model can further include re-recording one or more of the voice samples comprising live or recorded audio of the subscriber speaking.

Detecting Scam Callers in Phone Calls

Figure 5:
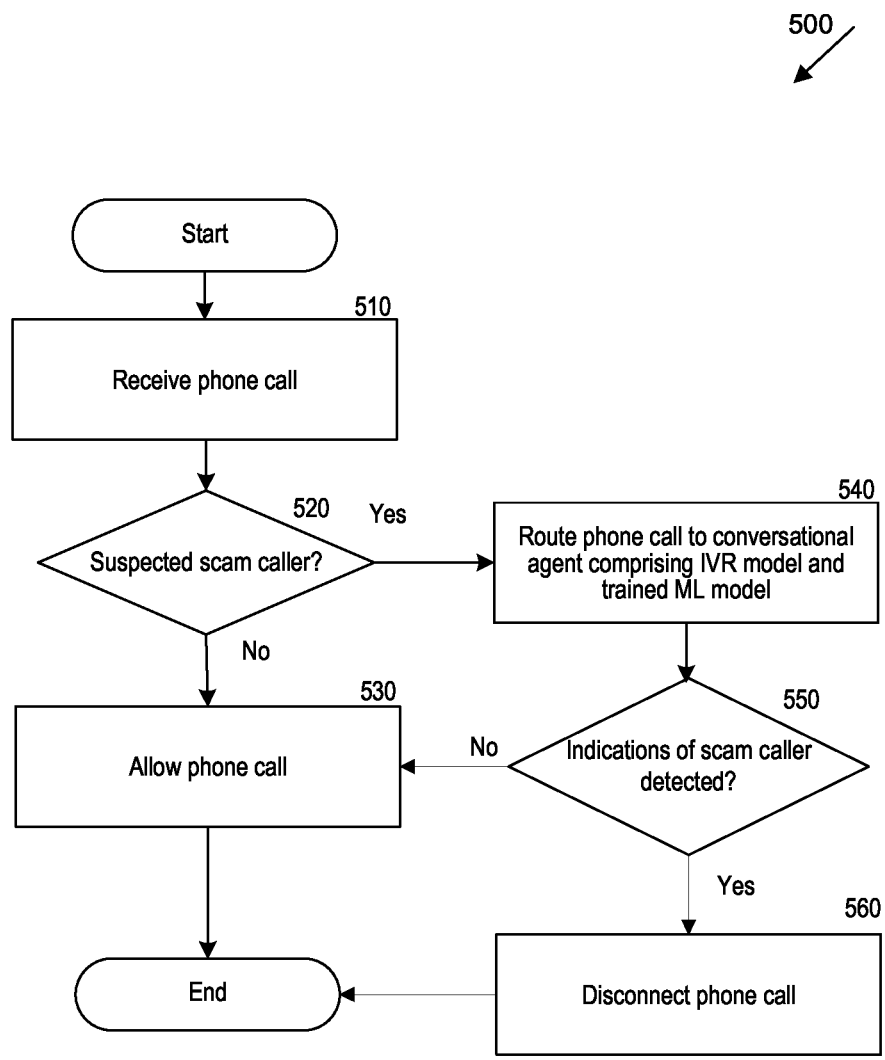
FIG. 5 is a flow diagram illustrating an example process for applying a conversational agent comprising an IVR model and a trained machine learning model to detect indications of a scam caller in a received phone call.

FIG. 5 is a flow diagram illustrating a process 500 for detecting a scam caller in a phone call using a conversational agent comprising an IVR model and a trained machine learning model. The process 500 begins at block 510, where a phone call is received at a mobile device associated with a subscriber of a telecommunications service provider.

The process 500 then proceeds to decision block 520, where an assessment is made regarding whether the received call is associated with a suspected scam caller. This assessment can be made, for example, using T-Mobile Scam-Shield™ technology and/or otherwise assessing data or metadata associated with the call. Assessed data can include an identifier associated with the caller (e.g., a phone number), a location of origin for the call (e.g., city, country, etc.), a number type (e.g., toll-free, within a certain number range, etc.), device information associated with the caller, network-level data, and so forth. The assessment can be based on one or more contact lists or whitelists of callers who are known good callers and/or one or more block lists or blacklists of callers who are known scam callers. In some implementations decision block 520 can be optional, and a subscriber may choose to route all phone calls to a conversational agent. Additionally or alternatively, a subscriber can manually choose whether to route a call to the conversational agent (e.g., by pressing a button or icon on an interface displayed on a mobile device). For example, when a call is received at a mobile device, the interface can display to the user at least three buttons or icons corresponding to options for (1) accepting a call, (2) declining a call, and (3) routing a call to the conversational agent of the disclosed system.

If the received phone call is not associated with a suspected scam caller then the process 500 proceeds block 530, where the call is allowed. That is, the call bypasses the conversational agent and is allowed to proceed as a normal phone call, which the subscriber can accept or decline as usual.

If the received phone call is associated with a suspected scam caller (or the call is otherwise routed to the system), then the process 500 proceeds to block 540, where the call is routed a conversational agent comprising an IVR model and a trained machine learning model. As described herein, the IVR model is trained or configured to simulate speech of the subscriber and to engage the caller in a simulated conversation. And the trained machine learning model, as described herein, is trained to detect indications of a scam caller in a phone call. Thus, at block 540 the call is received by the conversational agent and the conversational agent, using the IVR model, engages the caller in a simulated conversation while simulating speech by the subscriber. During the simulated conversation, the trained machine learning model analyzes call data (e.g., live call audio) of the phone call to detect indications of a scam caller.

The process 500 then proceeds to decision block 550, where it is determined whether indications of a scam caller are detected in the phone call. If no indications of a scam caller are detected (e.g., as assessed based on a threshold level or probability), then the process proceeds to block 530, where the phone call is allowed. That is, the call is allowed to proceed as a normal phone call, which the subscriber can accept or decline as usual.

If, at decision block 550, it is determined that the received phone call is associated with a likely scam caller (e.g., based on a threshold level or probability) then the process proceeds to block 560, where the call is automatically disconnected. Additionally or alternatively, a notice can be generated (e.g., for display on an interface of the subscriber mobile device) that the received call is associated with a likely scam caller. In some implementations, the notice includes buttons or icons allowing a subscriber to choose whether to accept or decline the call and/or to confirm that the caller is a scam caller. For example, the notice can include a transcription of at least a portion of the call allowing the subscriber to assess the content of the call and confirm whether the caller is a likely scam caller.

In some implementations, the process 500 includes generating a log entry, database entry, or other record of a received phone call and whether the call was determined to be associated with a likely scam caller. The record can include, for example, call data and/or metadata, such as phone number information (e.g., phone number, location, name or business associated with the phone number, telecommunications service provider associated with the phone number, etc.), call audio, and so forth. The record can then be used, for example, to generate or update caller whitelists and blacklists, such as those used to determine whether a caller is a suspected scam caller (e.g., at decision block 520). Additionally, the record can be stored for later assessment and evaluation to determine accuracy of the conversational agent in detecting scam callers.

Computing System

Figure 6:
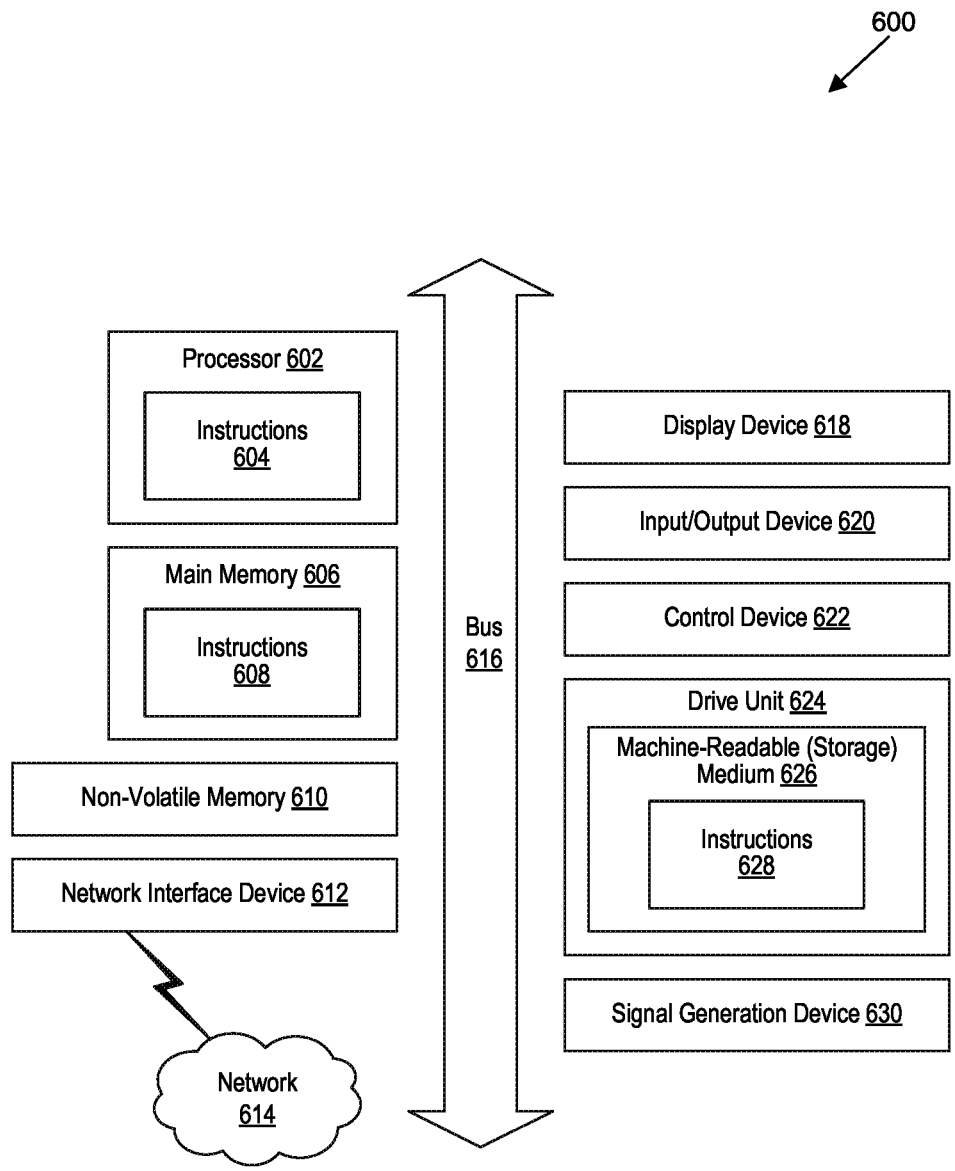
FIG. 6 is a block diagram illustrating an example of a computing system in which at least some operations described herein can be implemented.

FIG. 6 is a block diagram illustrating an example of a computing system 600 in which at least some operations described herein can be implemented. As shown, the computing system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computing system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computing system 600 can be an embedded computer system, a system-on-chip (SOC), a single-board computer system (SBC) or a distributed system such as a mesh of computer systems or include one or more cloud components in one or more networks. Where appropriate, one or more computing systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A computing system for automated detection of scam calls, the computing system comprising:
at least one hardware processor; and
at least one memory storing instructions that, when executed by the at least one hardware processor, cause the computing system to perform a process comprising:
receiving a phone call over a telecommunication network based on the phone call being routed away from a subscriber of the telecommunication network, wherein the subscriber is associated with a first model configured to simulate speech of the subscriber;
simulating, via the first model, the speech of the subscriber to induce one or more responses from a caller of the phone call;
classifying, via a second model, the caller of the phone call as a scam caller or not a scam caller based on the one or more responses; and
processing the phone call based on whether the caller is classified as a scam caller.

2. The computing system of claim 1, wherein processing the phone call comprises automatically disconnecting the phone call in response to the caller being classified as a scam caller.

3. The computing system of claim 1, wherein processing the phone call comprises displaying a notice on a subscriber mobile device of the subscriber, the notice indicating that the caller is classified as a scam caller.

4. The computing system of claim 3, wherein the notice that is displayed on the subscriber mobile device comprises features allowing the subscriber to accept or decline the phone call.

5. The computing system of claim 3, wherein the notice that is displayed on the subscriber mobile device includes a transcription of at least a portion of the one or more responses from the caller of the phone call.

6. The computing system of claim 1, wherein the process performed by the computing system further comprises:
generating a database entry indicating whether the caller is classified as a scam caller; and
causing, using the database entry, a second phone call over the telecommunication network to be routed away from a destination based on the second phone call originating from the caller.

7. The computing system of claim 1, wherein the caller is classified as not a scam caller based on the one or more responses mentioning at least a portion of subscriber-specific information stored in a profile of the subscriber used by the second model.

8. A method comprising:
receiving an audio/video communication over a telecommunication network based on the audio/video communication being routed away from a subscriber of the telecommunication network, wherein the subscriber is associated with a first model configured to simulate audio data associated with the subscriber;
simulating, via the first model, speech of the subscriber to induce one or more responses from a caller of the audio/video communication;
classifying, via a second model, the caller of the audio/video communication as a scam caller or not a scam caller based on the one or more responses; and
processing the audio/video communication based on whether the caller is classified as a scam caller.

9. The method of claim 8, wherein processing the audio/video communication comprises automatically disconnecting the audio/video communication in response to the caller being classified as a scam caller.

10. The method of claim 8, wherein processing the audio/video communication comprises displaying a notice on a subscriber mobile device of the subscriber, the notice indicating that the caller is classified as a scam caller.

11. The method of claim 10, wherein the notice that is displayed on the subscriber mobile device comprises features allowing the subscriber to accept or decline the audio/video communication.

12. The method of claim 10, wherein the notice that is displayed on the subscriber mobile device includes a transcription of at least a portion of the one or more responses from the caller of the audio/video communication.

13. The method of claim 8, further comprising:
generating a database entry indicating whether the caller is classified as a scam caller; and
causing, using the database entry, a second audio/video communication over the telecommunication network to be routed away from a destination based on the second audio/video communication originating from the caller.

14. The method of claim 8, wherein the caller is classified as not a scam caller based on the one or more responses mentioning at least a portion of subscriber-specific information stored in a profile of the subscriber used by the second model.

15. At least one non-transitory computer-readable medium storing instructions that, when executed by at least one processor, cause the at least one processor to perform operations comprising:
receiving a phone call over a telecommunication network based on the phone call being routed away from a subscriber of the telecommunication network, wherein the subscriber is associated with a first model configured to simulate speech of the subscriber;
simulating, via the first model, the speech of the subscriber to induce one or more responses from a caller of the phone call;
classifying, via a second model, the caller of the phone call as a scam caller or not a scam caller based on the one or more responses; and
processing the phone call based on whether the caller is classified as a scam caller.

16. The at least one non-transitory computer-readable medium of claim 15, wherein processing the phone call comprises automatically disconnecting the phone call in response to the caller being classified as a scam caller.

17. The at least one non-transitory computer-readable medium of claim 15, wherein processing the phone call comprises displaying a notice on a subscriber mobile device of the subscriber, the notice indicating that the caller is classified as a scam caller.

18. The at least one non-transitory computer-readable medium of claim 17, wherein the notice that is displayed on the subscriber mobile device includes a transcription of at least a portion of the one or more responses from the caller of the phone call.

19. The at least one non-transitory computer-readable medium of claim 15, wherein the operations further comprise:
generating a database entry indicating whether the caller is classified as a scam caller; and
causing, using the database entry, a second phone call over the telecommunication network to be routed away from a destination based on the second phone call originating from the caller.

20. The at least one non-transitory computer-readable medium of claim 15, wherein the caller of the phone call is classified via the second model using a profile of the subscriber that stores subscriber-specific information, wherein the caller is classified as not a scam caller based on the one or more responses mentioning at least a portion of subscriber-specific information stored in the profile of the subscriber.

* * * * *